United States Patent
Tsuchiya et al.

(10) Patent No.: US 8,692,942 B2
(45) Date of Patent: Apr. 8, 2014

(54) DATA PROCESSING APPARATUS, LIQUID CRYSTAL DISPLAY DEVICE, TELEVISION RECEIVER, AND DATA PROCESSING METHOD

(75) Inventors: Toshikazu Tsuchiya, Osaka (JP); Masae Kawabata, Osaka (JP); Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 438 days.

(21) Appl. No.: 12/737,728

(22) PCT Filed: Jun. 5, 2009

(86) PCT No.: PCT/JP2009/060370
§ 371 (c)(1),
(2), (4) Date: Feb. 10, 2011

(87) PCT Pub. No.: WO2010/021183
PCT Pub. Date: Feb. 25, 2010

(65) Prior Publication Data
US 2011/0261266 A1    Oct. 27, 2011

(30) Foreign Application Priority Data
Aug. 19, 2008   (JP) ................................. 2008-210829

(51) Int. Cl.
*H04N 1/60*     (2006.01)
(52) U.S. Cl.
USPC ........... 348/761; 348/728; 348/808; 348/807; 345/88; 345/690; 358/518
(58) Field of Classification Search
USPC ................. 348/728, 760, 761, 766, 808, 807; 345/88, 87, 90, 690; 358/518, 525
See application file for complete search history.

(56) References Cited

U.S. PATENT DOCUMENTS 6,734,875 B1   5/2004   Tokimoto et al.
7,092,032 B1   8/2006   Matsunaga et al.
(Continued)

FOREIGN PATENT DOCUMENTS

CN   1804971    7/2006
EP   1 225 558  7/2002
(Continued)

OTHER PUBLICATIONS

International Search Report for PCT/JP2009/060370.
(Continued)

*Primary Examiner* — Jeffeery Harold
*Assistant Examiner* — Jean W Desir
(74) *Attorney, Agent, or Firm* — Harness, Dickey & Pierce, P.L.C.

(57) ABSTRACT

Provided is a data processing apparatus including a correction circuit. In at least one embodiment, the data correction circuit acquires pixel data of a first pixel for display of a first color component and pixel data of a second pixel for display of a second color component, the second pixel being driven by a scanning signal line which drives the first pixel and being driven by a data signal line which is adjacent to the first pixel, and corrects the pixel data of the second pixel in accordance with a relationship between a value of the pixel data of the first pixel and a value of the pixel data of the second pixel. Thus, it is possible to cause a liquid crystal driving panel to perform uniform display without causing display unevenness even in a case where a halftone of a specific color component is uniformly displayed.

11 Claims, 11 Drawing Sheets

(56) References Cited

U.S. PATENT DOCUMENTS

| | | |
|---|---|---|
| 7,277,075 B1 | 10/2007 | Hirano et al. |
| 7,280,705 B1 | 10/2007 | Frank et al. |
| 7,333,096 B2 | 2/2008 | Washio et al. |
| 2002/0008686 A1 | 1/2002 | Kumada et al. |
| 2003/0048248 A1 | 3/2003 | Fukumoto et al. |
| 2004/0051470 A1 | 3/2004 | Hashimoto et al. |
| 2005/0110737 A1 | 5/2005 | Hosotani |
| 2005/0168424 A1 | 8/2005 | Nakamoto et al. |
| 2006/0007094 A1 | 1/2006 | Kang et al. |
| 2006/0017678 A1 | 1/2006 | Shiomi |
| 2006/0023150 A1 | 2/2006 | Mochizuki |
| 2006/0041805 A1 | 2/2006 | Song |
| 2007/0120771 A1 | 5/2007 | Hashimoto et al. |
| 2007/0214045 A1 | 9/2007 | Subramanian et al. |
| 2007/0222724 A1 | 9/2007 | Ueno et al. |
| 2007/0290948 A1 | 12/2007 | Hashimoto et al. |
| 2008/0018630 A1 | 1/2008 | Fujino |
| 2009/0012903 A1 | 1/2009 | Subramanian et al. |
| 2010/0023396 A1 | 1/2010 | Subramanian et al. |
| 2013/0088527 A1* | 4/2013 | Irie et al. .................. 345/690 |

FOREIGN PATENT DOCUMENTS

| | | |
|---|---|---|
| EP | 1 607 927 | 12/2005 |
| EP | 1 768 095 | 3/2007 |
| GB | 2 313 465 | 11/1997 |
| JP | 11296149 A | 10/1999 |
| JP | 11352938 A | 12/1999 |
| JP | 2000-330088 | 11/2000 |
| JP | 2001-051252 | 2/2001 |
| JP | 2001-147666 | 5/2001 |
| JP | 2002108312 A | 4/2002 |
| JP | 2006023710 A | 1/2006 |
| JP | 2006058846 A | 3/2006 |
| JP | 2007-218986 | 8/2007 |
| RU | 2 249 858 | 4/2005 |
| RU | 2 257 684 | 7/2005 |

OTHER PUBLICATIONS

International Search Report for PCT/JP2009/061522.
Office Action for copending U.S. Appl. No. 12/737,559 dated Oct. 15, 2013.

* cited by examiner

F I G. 6
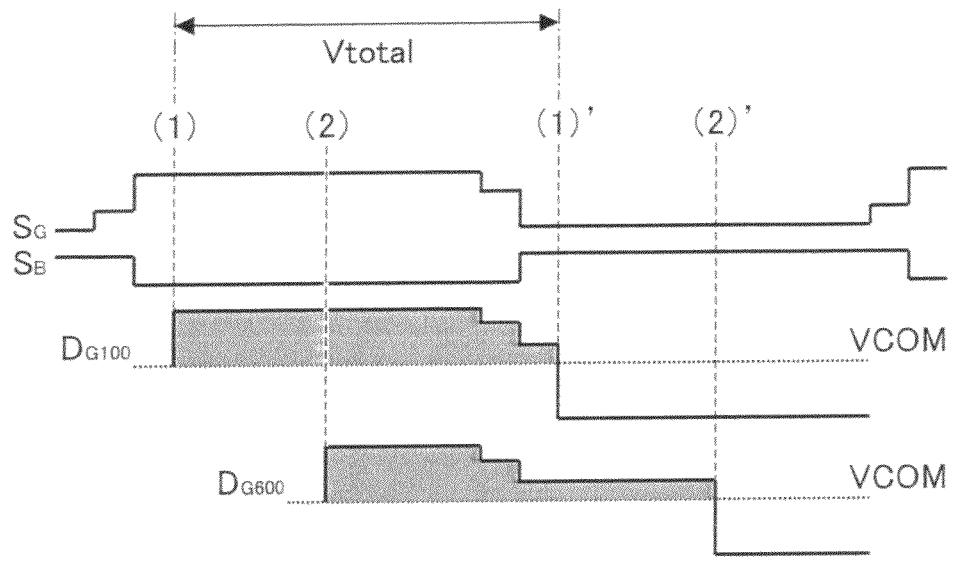
F I G. 7
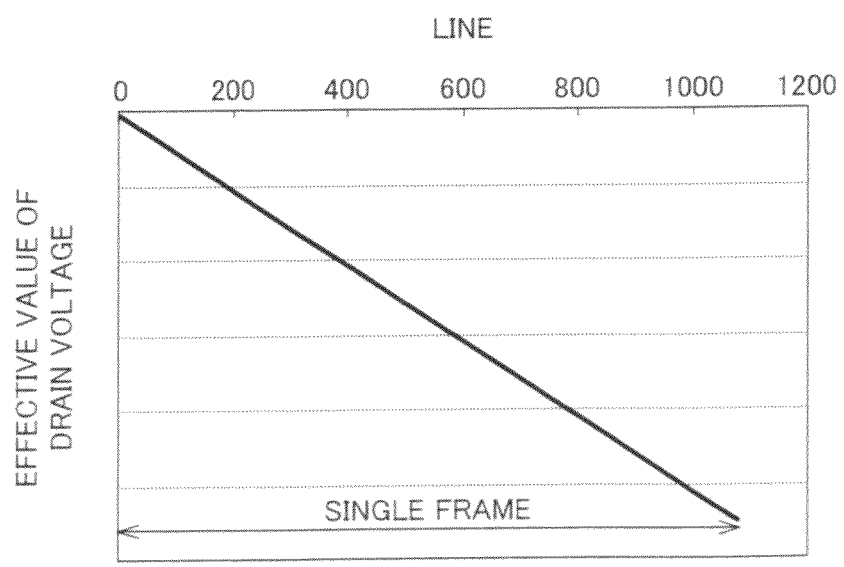

48 LINES

F I G. 1 4
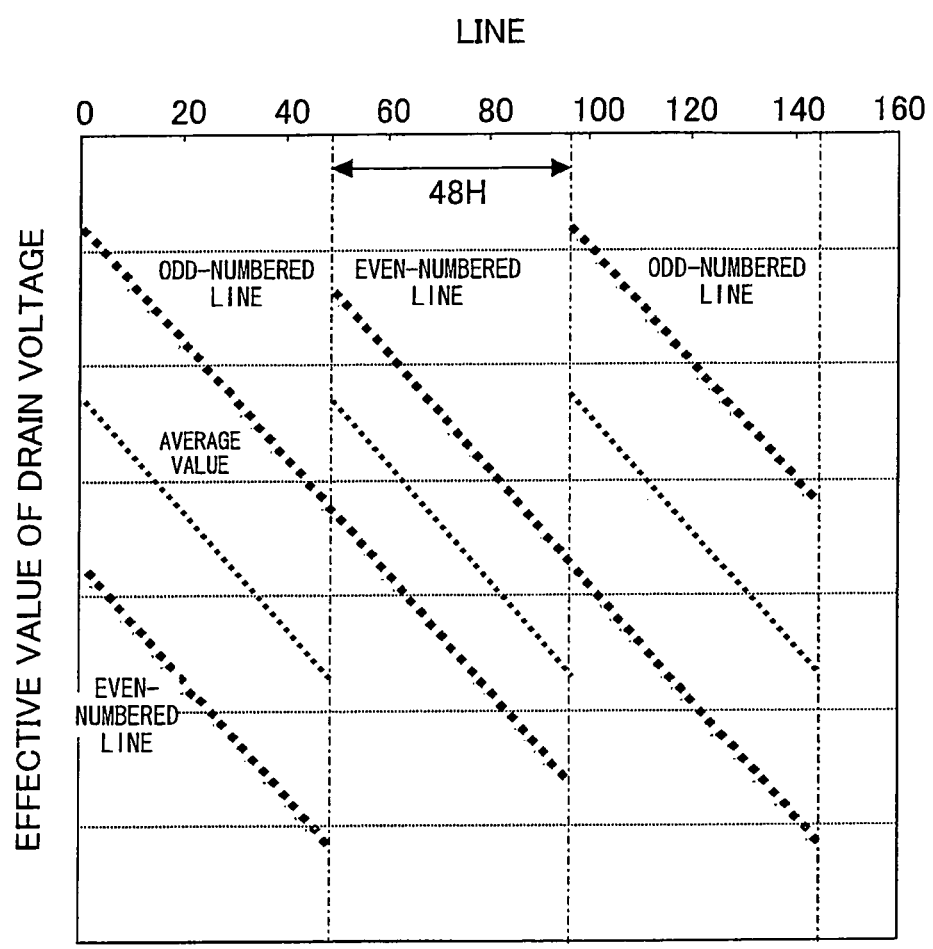

FIG. 15

| | | BLUE GRADATION | | | | | | |
|---|---|---|---|---|---|---|---|---|
| | | 0 | 1 | 2 | 3 | 4 | 5 | 6 |
| GREEN GRADATION | 0 | 0 | 0 | 0 | 0 | 0 | 0 | 0 |
| | 8 | 1 | 0 | 0 | 0 | 0 | 0 | 0 |
| | 16 | 2 | 1 | 0 | 0 | 0 | 0 | 0 |
| | 24 | 2 | 1 | 0 | 0 | 0 | 0 | 0 |
| | 32 | 3 | 2 | 1 | 0 | 0 | 0 | 0 |
| | 40 | 3 | 2 | 1 | 0 | 0 | 0 | 0 |
| | 48 | 4 | 3 | 2 | 1 | 0 | 0 | 0 |
| | 56 | 4 | 3 | 2 | 1 | 0 | 0 | 0 |
| | 64 | 5 | 4 | 3 | 2 | 1 | 0 | 0 |
| | 72 | 5 | 4 | 3 | 2 | 1 | 0 | 0 |
| | 80 | 6 | 5 | 4 | 3 | 2 | 1 | 0 |
| | 88 | 6 | 5 | 4 | 3 | 2 | 1 | 0 |
| | 96 | 5 | 4 | 3 | 2 | 1 | 0 | 0 |
| | 104 | 5 | 4 | 3 | 2 | 1 | 0 | 0 |
| | 112 | 4 | 3 | 2 | 1 | 0 | 0 | 0 |
| | 120 | 4 | 3 | 2 | 1 | 0 | 0 | 0 |
| | 128 | 3 | 2 | 1 | 0 | 0 | 0 | 0 |
| | 136 | 3 | 2 | 1 | 0 | 0 | 0 | 0 |
| | 144 | 2 | 1 | 0 | 0 | 0 | 0 | 0 |
| | 152 | 2 | 1 | 0 | 0 | 0 | 0 | 0 |
| | 160 | 1 | 0 | 0 | 0 | 0 | 0 | 0 |
| | 168 | 1 | 0 | 0 | 0 | 0 | 0 | 0 |
| | 176 | 0 | 0 | 0 | 0 | 0 | 0 | 0 |
| | 184 | 0 | 0 | 0 | 0 | 0 | 0 | 0 |
| | 192 | 0 | 0 | 0 | 0 | 0 | 0 | 0 |
| | 200 | 0 | 0 | 0 | 0 | 0 | 0 | 0 |
| | 208 | 0 | 0 | 0 | 0 | 0 | 0 | 0 |
| | 216 | 0 | 0 | 0 | 0 | 0 | 0 | 0 |
| | 224 | 0 | 0 | 0 | 0 | 0 | 0 | 0 |
| | 232 | 0 | 0 | 0 | 0 | 0 | 0 | 0 |
| | 240 | 0 | 0 | 0 | 0 | 0 | 0 | 0 |
| | 248 | 0 | 0 | 0 | 0 | 0 | 0 | 0 |
| | 255 | 0 | 0 | 0 | 0 | 0 | 0 | 0 |

DATA PROCESSING APPARATUS, LIQUID CRYSTAL DISPLAY DEVICE, TELEVISION RECEIVER, AND DATA PROCESSING METHOD

TECHNICAL FIELD

The present invention relates to (i) a data processing apparatus that corrects an image signal externally supplied to a liquid crystal display device which displays an image by application of a voltage to liquid crystal and (ii) a liquid crystal display device.

BACKGROUND ART

Liquid crystal display devices are flat display devices which have excellent features such as high definition, low profile, light weight, and low power consumption. In recent years, a market scale of liquid crystal display devices have been rapidly increasing due to improved display performance, increased production capacity, and improved price competitiveness against other display devices.

If a direct current voltage continues to be applied to a liquid crystal layer of such liquid crystal display device for a long time, elements get deteriorated. Therefore, in order to secure a long life of such liquid crystal display device, it is necessary to perform alternating driving (inversion driving) in which the polarity of a voltage to be applied is inverted periodically.

However, in a case where an active matrix liquid crystal display device employs frame inversion driving in which the polarity of a voltage is inverted for every frame, it is inevitable that some unbalance is seen in a plus/minus voltage to be applied to liquid crystal due to various factors such as anisotropy of liquid crystal dielectric constant, variation in pixel potential that is caused by parasitic capacitance between a gate and a source of a pixel TFT (Thin Film Transistor), and a slip of a center value of a counter electrode signal. Consequently, a minor variation in luminance occurs at a frequency that is a half of a frame frequency, making a user see flickers. In order to solve this problem, there is generally employed inversion driving in which pixel signals have opposite polarities between adjacent lines or adjacent pixels as well as voltages are inverted with respect to each frame.

In a case where dot inversion in which the polarity of a voltage is inverted with respect to each pixel is performed, a charging rate of a pixel drops due to signal delay in a data signal line. In order to solve this problem, there is proposed a driving mode in which the polarity of a data signal voltage is inverted for every plural horizontal periods (plural rows). Such a driving mode in which the polarity is inverted for every plural horizontal periods in largely classified into block inversion driving and multi-line inversion driving. The block inversion driving is a mode in which gate lines are divided into blocks and interlace scanning is performed for each of the blocks. The multi-line inversion driving is a mode in which a polarity is inverted every time a plurality of lines are scanned by sequential scanning.

CITATION LIST

Patent Literature 1

Japanese Patent Application Publication, Tokukai, No. 2002-108312 A (Publication Date: Apr. 10, 2002)

SUMMARY OF INVENTION

Technical Problem

In a case where, for example, a certain tone (halftone) of green is displayed (green halftone uniform display) on an entire screen of a liquid crystal display device that employs block inversion driving in which gate lines are divided into blocks each of which contains 48 lines, a stripe may occur for every 48 lines as shown in FIG. 12. Such a stripe occurs, for example, due to coupling that occurs between a pixel and a source line within a liquid crystal panel of the liquid crystal display device. The following description deals with a case where a green pixel G, a blue pixel B, a source line $S_G$ corresponding to the pixel G, and a source line $S_B$ corresponding to the pixel B are disposed in a liquid crystal panel in the order of the source line $S_G$, green pixel G, source line $S_B$, and blue pixel B as shown in FIG. 13.

In this case, capacitance Cpix of the green pixel G is a sum of capacitance Cpix' intrinsic to the green pixel, parasitic capacitance $Csd_{self}$ and parasitic capacitance $Csd_{other}$. The parasitic capacitance $Csd_{self}$ is parasitic capacitance caused by coupling between the capacitance Cpix' intrinsic to the green pixel and the source line $S_G$. The parasitic capacitance $Csd_{other}$ is parasitic capacitance caused by coupling between the capacitance Cpix' intrinsic to the green pixel and the source line $S_B$. Because of these parasitic capacitances, a drain voltage of a TFT changes as a voltage level of a source signal voltage of a source line changes.

FIG. 14 is a graph showing that an effective value of a drain voltage changes from one line to another in a case where green halftone uniform display is carried out by block inversion driving. In the block inversion driving shown in FIG. 14, a polarity is inverted for every 50 horizontal periods, and 48 lines are driven during the 50 horizontal period. That is, 2 horizontal periods are blank periods. Accordingly, 2 horizontal periods are assigned, as blank periods, for every 48 lines.

In a case where driving is performed as above, a period that is under influence of a source signal voltage of an antipolarity varies depending on timing of gate-on of the lines. This causes an effective value of a drain voltage to differ from one line to another.

Consequently, a gradual decline in luminance occurs every 48 lines in accordance with the change in effective value of the drain voltage shown in FIG. 14. This decline in luminance occurring every 48 lines produces a stripe every 48 lines. Such a stripe occurs also in a case where red halftone uniform display or blue halftone uniform display is carried out.

Also in a case where frame inversion driving in which a polarity is inverted every 1 frame or a driving mode in which an entire screen is driven by interlace scanning is employed, a decline in luminance occurs during 1 frame by a similar mechanism, thereby leading to a problem that luminance changes gradually from an upper portion towards a lower portion of a display screen. Further, also in a case where multi-line inversion driving is employed, a decline in luminance occurs every plural lines by a similar mechanism, thereby resulting in that a stripe is produced every plural lines.

Patent Literature 1 discloses a driving circuit of a liquid crystal display device, which driving circuit includes a voltage level shifting means for shifting a voltage level of a source signal voltage supplied from a source driver. However, Patent Literature 1 fails to disclose a technique for changing a source signal voltage so as to suppress occurrence of stripes occurring in a case where a driving mode such as block inversion driving is employed.

The present invention was attained in view of the above problems, and an object of the present invention is to provide a data processing device that can cause a liquid crystal driving panel to perform uniform display without causing display unevenness even in a case where a halftone of a specific color component is uniformly displayed.

Solution to Problem

In order to attain the above object, a data processing apparatus of the present invention which corrects an image signal constituted by a plurality of pixel data that are externally supplied to an active matrix liquid crystal driving panel including a plurality of scanning signal lines that extend in one direction, a plurality of data signal lines that extend in another direction, and a plurality of pixels that are provided so as to correspond to respective intersections of the plurality of scanning signal lines and the plurality of data signal lines, includes a correction processing section that (i) acquires pixel data of a first pixel for display of a first color component and pixel data of a second pixel for display of a second color component, the second pixel being driven by a scanning signal line which drives the first pixel and being driven by a data signal line which is adjacent to the first pixel, and (ii) corrects the pixel data of the second pixel in accordance with a relationship between a value of the pixel data of the first pixel and a value of the pixel data of the second pixel.

A data processing method of the present invention for correcting an image signal constituted by a plurality of pixel data that are externally supplied to an active matrix liquid crystal driving panel including a plurality of scanning signal lines that extend in one direction, a plurality of data signal lines that extend in another direction, and a plurality of pixels that are provided so as to correspond to respective intersections of the plurality of scanning signal lines and the plurality of data signal lines, includes the steps of: acquiring pixel data of a first pixel for display of a first color component and pixel data of a second pixel for display of a second color component, the second pixel being driven by a scanning signal line which drives the first pixel and being driven by a data signal line which is adjacent to the first pixel; and correcting the pixel data of the second pixel in accordance with a relationship between a value of the pixel data of the first pixel and a value of the pixel data of the second pixel.

The first pixel, the data signal line which drives the second pixel, and the second pixel are disposed in this order. In this case, driving of the first pixel is affected by coupling between the first pixel and the data signal line which drives the second pixel. In a case where a halftone of the first color component is uniformly displayed, luminance gradually changes from one display position to another due to the influence of the coupling. As a result, display unevenness occurs.

According to the arrangement or the method, the pixel data of the second pixel is corrected in accordance with the value of the pixel data of the first pixel. Specifically, the value of the pixel data of the second pixel is corrected so that the display unevenness caused by the coupling between the first pixel and the data signal line which drives the second pixel is reduced. Consequently, even in a case where a halftone of a specific color component is uniformly displayed, it is possible to cause a liquid crystal driving panel to perform uniform display without causing display unevenness.

The data processing apparatus of the present invention may further include a buffer that stores the pixel data of the first pixel and the pixel data of the second pixel, and the correction processing section may acquire, from the buffer, the pixel data of the first pixel and the pixel data of the second pixel.

In the arrangement, the data processing apparatus of the present invention may be arranged such that the data processing apparatus further includes a correction amount memory section that stores correction amount data corresponding to a combination of the value of the pixel data of the first pixel and the value of the pixel data of the second pixel, and the correction processing section carries out the correction with reference to the correction amount memory section.

According to the arrangement, the data processing apparatus includes the correction amount storage section that stores correction amount data corresponding to a combination of the value of the pixel data of the first pixel and the value of the pixel data of the second pixel. Accordingly, it is possible to perform appropriate correction in a case where correction amount data which can reduce display unevenness caused by the coupling between the first pixel and the data signal line which drives the second pixel is stored in advance in the correction amount storage section.

Another arrangement is also possible in which the correction is carried out by calculation. However, in a case where correction is carried out with reference to the correction amount data stored in the correction amount memory section, it is possible to more speedily carry out the processing with a simpler configuration.

In the arrangement, the data processing apparatus of the present invention may be arranged such that the correction processing section calculates a correction amount by carrying out interpolation calculation based on data stored in the correction amount memory section.

According to the arrangement, the correction processing section calculates a correction amount by carrying out interpolation calculation. Accordingly, it is possible to reduce an amount of data to be stored in the correction amount memory section. This makes it possible to reduce a memory capacity of the correction amount memory section, thereby allowing a reduction in cost for the apparatus. Further, since the correction amount is calculated by carrying out interpolation calculation, it is possible to more accurately set the correction amount as compared to a case where no interpolation calculation is carried out, provided that an amount of data stored in the correction amount memory section is equal. That is, according to the arrangement, it is possible to reduce a memory capacity of the correction amount memory section without sacrificing accuracy of correction amount setting, thereby allowing a reduction in cost.

In the arrangement, the data processing apparatus of the present invention may be arranged such that the image signal contains pixel data of a red color component, pixel data of a green color component, and pixel data of a blue color component, and the correction processing section carries out the correction with respect to each of the pixel data of the red color component, the pixel data of the green color component, and the pixel data of the blue color component.

According to the arrangement, the correction is carried out with respect to each of the pixel data of the red color component, the pixel data of the green color component, and the pixel data of the blue color component. Accordingly, even in a case where a halftone of any one of the color components is uniformly displayed, it is possible to cause a liquid crystal driving panel to perform uniform display without causing display unevenness.

A liquid crystal display device of the present invention includes an active matrix liquid crystal driving panel including a plurality of scanning signal lines that extend in one direction, a plurality of data signal lines that extend in another direction, and a plurality of pixels that are provided so as to correspond to respective intersections of the plurality of scanning signal lines and the plurality of data signal lines; a scanning signal driving section that sequentially applies, to the plurality of scanning signal lines, gate-on pulses each of which causes one of the plurality of scanning signal lines to be in a selected state; a data signal driving section that applies data signals to the plurality of data signal lines so that polarities of the data signals are inverted for every predetermined plural horizontal periods within 1 frame period; and the data processing device of the present invention.

According to the arrangement, it is possible to carry out correction so that the display unevenness caused by the coupling between the first pixel and the data signal line which drives the second pixel is reduced. Accordingly, even in a case where a halftone of a specific color component is uniformly displayed, it is possible to perform uniform display without causing display unevenness.

In the arrangement, the liquid crystal display device of the present invention may be arranged such that the data signal driving section carries out polarity inversion driving so that one polarity continues for plural horizontal scanning periods.

According to the arrangement, polarity inversion driving is carried out so that one polarity continues for plural horizontal scanning periods. Accordingly, a period affected by a source signal voltage of an antipolarity varies depending on a timing of gate-on of the scanning signal lines. This causes the influence of the coupling to vary from one scanning signal line to another, thereby causing display unevenness. Even in such an arrangement, it is possible to perform uniform display without causing display unevenness.

In the arrangement, the liquid crystal display device of the present invention may be arranged such that the plurality of scanning signal lines are divided into one or more blocks, and scanning signal lines in each of the blocks are further divided into groups, the scanning signal driving section sequentially scans blocks of scanning signal lines and sequentially scans the groups of scanning signal lines in each block such that the scanning signal lines in each block are interlace-scanned, and the data signal driving section applies the data signals to the plurality of data signal lines so that the polarities of the data signals are inverted at a timing of switching of a group to be scanned.

According to the arrangement, in which the scanning signal lines are interlace-scanned, a polarity of a voltage applied to a pixel is inverted every 1 line. This makes it possible to reduce flickers and to reduce display unevenness due to coupling capacitance by pixels that are adjacent in a longitudinal direction, as compared to a case where the scanning signal lines are sequentially scanned. Since the above problem can be prevented, it is easy to make a polarity inversion cycle for the interlace scanning longer than that for the sequential scanning. Accordingly, it is easy to reduce power consumption and to suppress heat generated in the data signal driving section.

In the arrangement, the liquid crystal display device of the present invention may be arranged such that the number of blocks into which the plurality of scanning signal lines are divided is 1.

According to the arrangement, a row in which a polarity is inverted is located in an end portion of a screen, thereby making display unevenness less noticeable.

In the arrangement, the liquid crystal display device of the present invention may be arranged such that the number of blocks into which the plurality of scanning signal lines are divided is two or more.

According to the arrangement, the scanning signal lines are divided into a plurality of blocks, and interlace scanning is carried out on a block-to-block basis. In this case, it is possible to reduce differences in scanning timing between the groups within each block, as compared to a case where all the scanning signal lines are interlace-scanned. This can suppress later-described combing, thereby improving a display quality.

In the arrangement, the liquid crystal display device of the present invention may be arranged such that the plurality of scanning signal lines are divided into one or more blocks, the scanning signal driving section sequentially scans the plurality of scanning signal lines so as to drive the plurality of scanning signal lines, and the data signal driving section applies the data signals to the plurality of data signal lines so that the polarities of the data signals are inverted at a timing of switching of a group to be scanned.

According to the arrangement, driving is carried out by sequential scanning. This eliminates the need for processes such as a process of switching the order of image signals that is necessary in a case where interlace scanning is carried out.

In the arrangement, the liquid crystal display device of the present invention may be arranged such that the number of blocks into which the plurality of scanning signal lines are divided is 1.

According to the arrangement, it is possible to realize driving in which a polarity of data signal is inverted every data signal line. Further, a polarity is inverted in a row located in an end portion of a screen, thereby making display unevenness less noticeable. Furthermore, it is possible to more effectively reduce power consumption and to more effectively suppress heat generated in the data signal driving section.

In the arrangement, the liquid crystal display device of the present invention may be arranged such that the number of blocks into which the plurality of scanning signal lines are divided is two or more.

According to the arrangement, it is possible to suppress occurrence of flickers.

It is also possible to realize a television receiver that includes the liquid crystal display device of the present invention and a tuner section that receives television broadcast.

Advantageous Effects of Invention

As described above, a data processing apparatus of the present invention includes a correction processing section that (i) acquires pixel data of a first pixel for display of a first color component and pixel data of a second pixel for display of a second color component, the second pixel being driven by a scanning signal line which drives the first pixel and being driven by a data signal line which is adjacent to the first pixel, and (ii) corrects the pixel data of the second pixel in accordance with a relationship between a value of the pixel data of the first pixel and a value of the pixel data of the second pixel. Thus, the value of the pixel data of the second pixel is corrected so that display unevenness caused by coupling between the first pixel and the data signal line which drives the second pixel is reduced. Consequently, it is possible to produce an effect that a liquid crystal driving panel can perform uniform display without causing display unevenness even in a case where a halftone of a specific color component is uniformly displayed.

Additional objects, advantages and novel features of the invention will be set forth in part in the description which follows, and in part will become apparent to those skilled in the art upon examination of the following or may be learned by practice of the invention.

Figure 3:
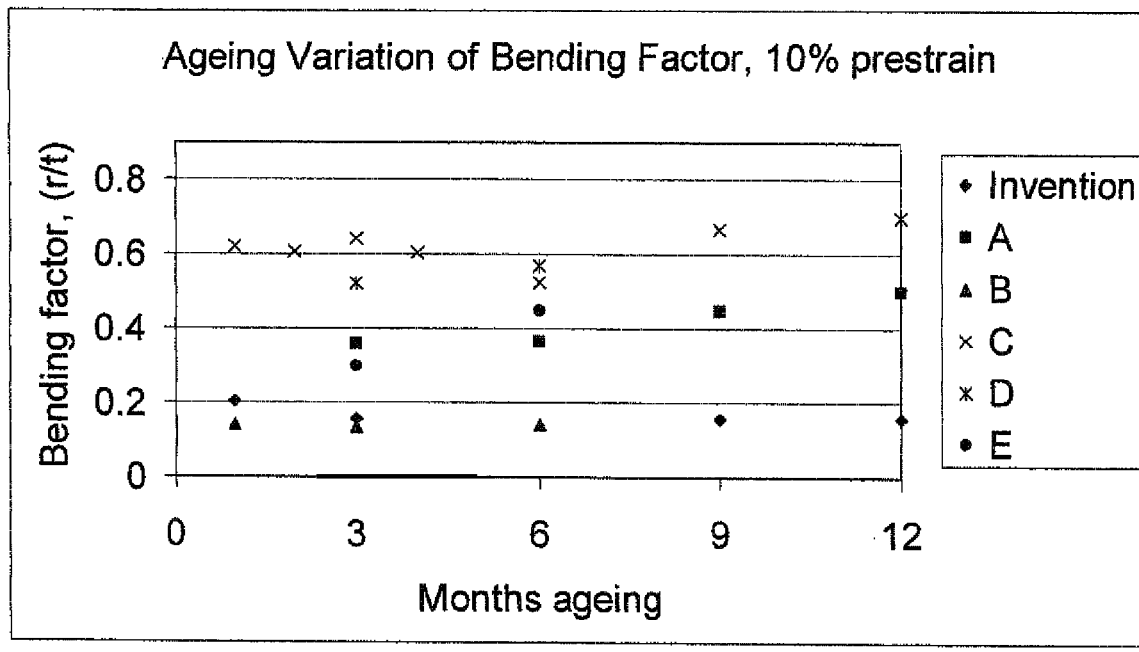

(a) of FIG. 3 is a timing chart showing how a drain voltage changes in response to a change in signal voltage of each source line in block inversion driving, and (b) of FIG. 3 is a table showing a period of homopolarity and a period of antipolarity of each of the first row and the 95th row.

Figure 4:
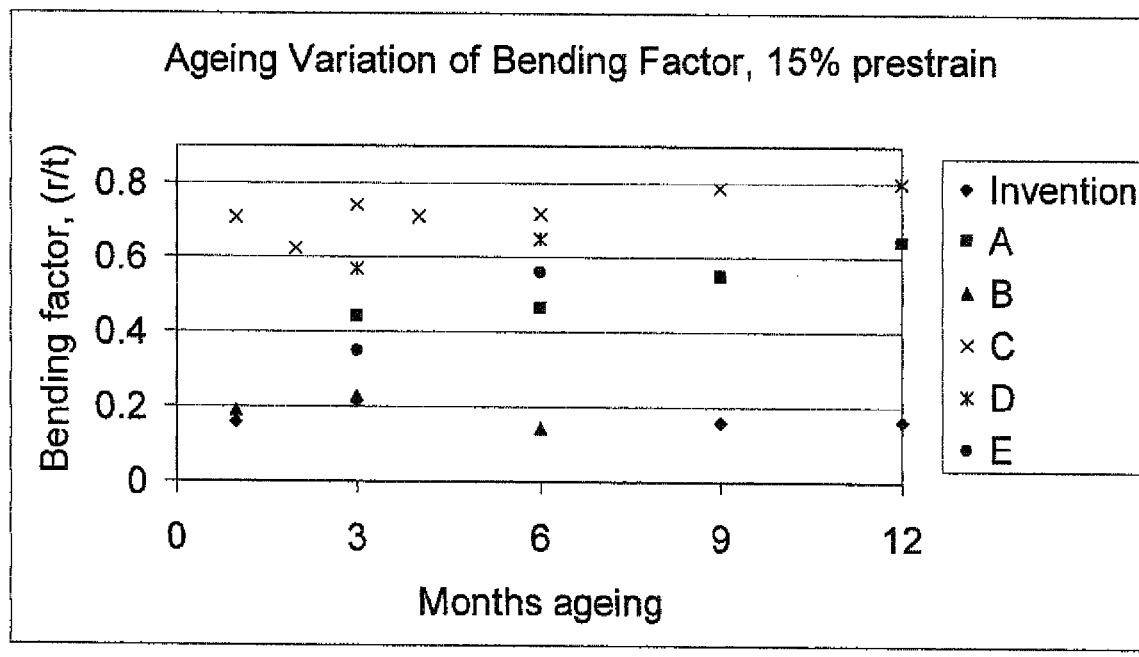

FIG. 4 is a V-T characteristic view showing a relationship between a gradation voltage and transmittance.

Figure 5:
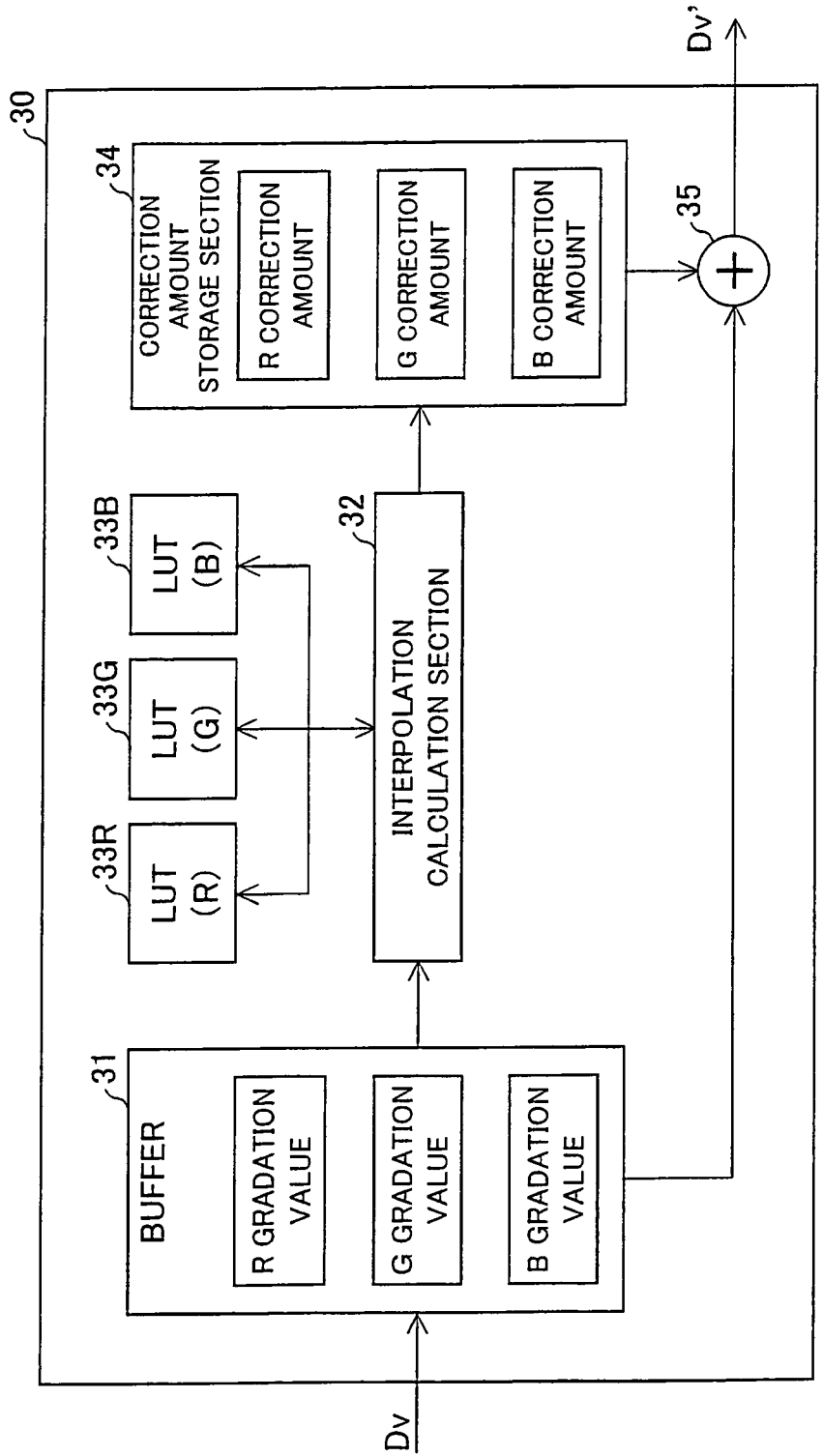

FIG. 5 is a block diagram illustrating an outline configuration of a correction circuit.

FIG. 6 is a timing chart showing how a drain voltage changes in response to a change in signal voltage of each source line in frame inversion driving.

FIG. 7 is a graph showing that an effective voltage reduction amount of a drain voltage changes from one line to another in frame inversion driving.

Figure 8:
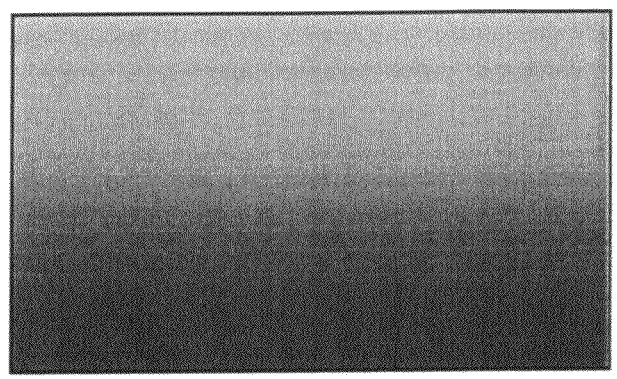

FIG. 8 is a view showing that gradation is generated within a screen on which green halftone uniform display is carried out.

Figure 9:
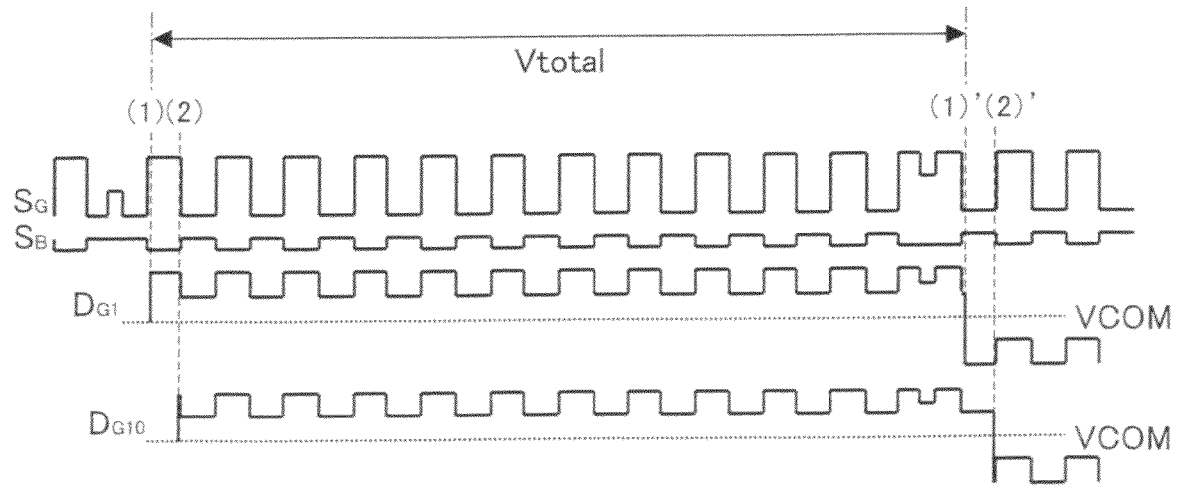

FIG. 9 is a timing chart showing how a drain voltage changes in response to a change in signal voltage of each source line in multi-line inversion driving.

Figure 10:
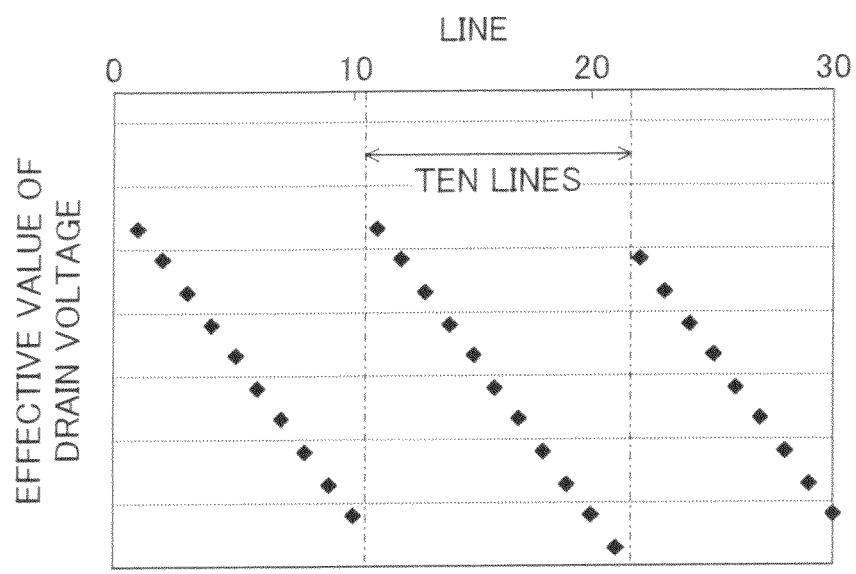

FIG. 10 is a graph showing that an effective voltage reduction amount of a drain voltage changes from one line to another in multi-line inversion driving.

Figure 11:
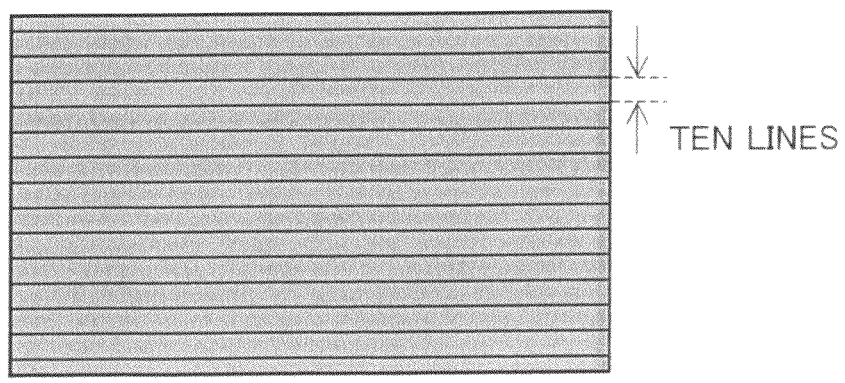

FIG. 11 is a view showing that a stripe is produced every 10 lines within a screen on which green halftone uniform display is carried out.

Figure 12:
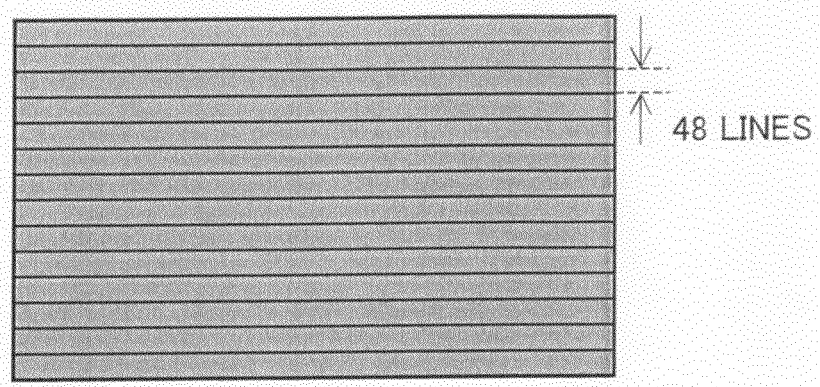

FIG. 12 is a view showing that a stripe is produced every 48 lines within a screen on which green halftone uniform display is carried out.

Figure 13:
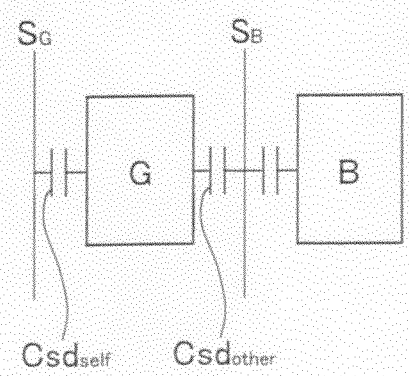

FIG. 13 is a block diagram illustrating parasitic capacitance in a liquid crystal panel.

FIG. 14 is a graph showing that an effective voltage reduction amount of a drain voltage changes from one line to another in block inversion driving.

FIG. 15 is a view illustrating an example of a LUT.

Figure 16:
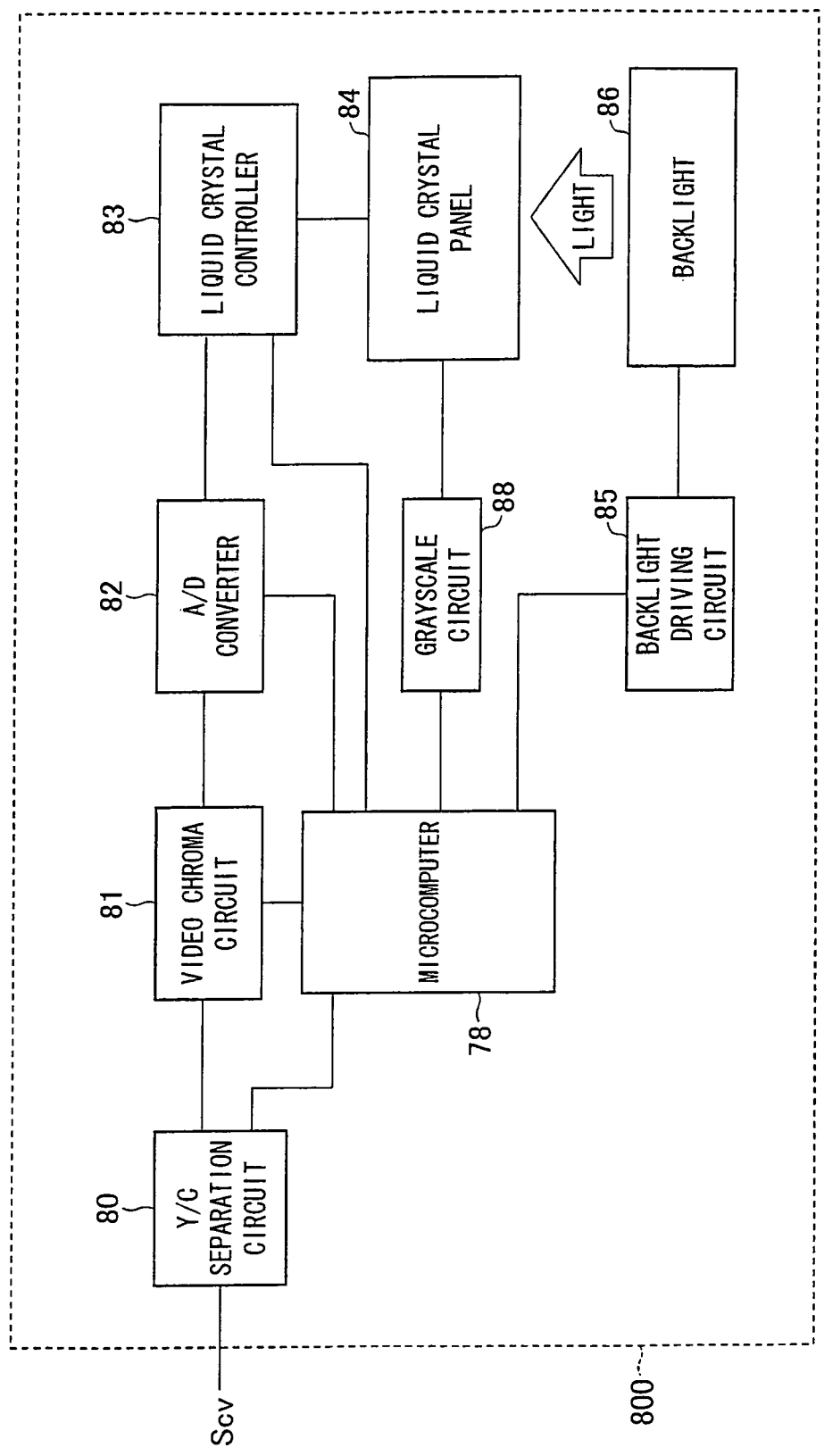

FIG. 16 is a block diagram illustrating a configuration of a display device for use in a television receiver.

Figure 17:
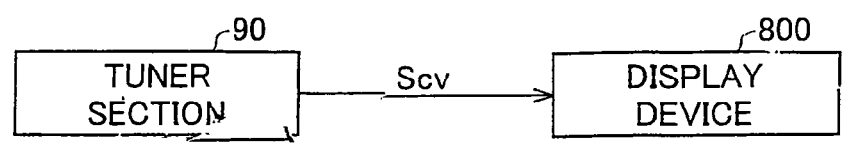

FIG. 17 is a block diagram illustrating how a tuner section is connected to the display device.

Figure 18:
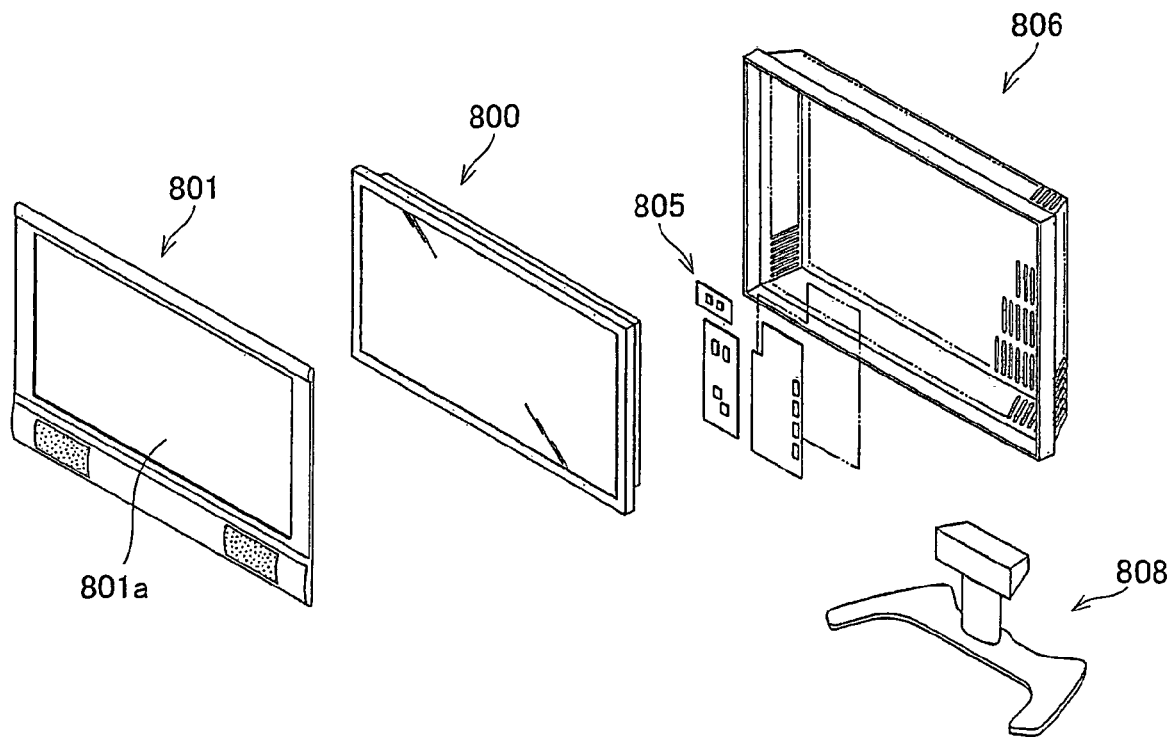

FIG. 18 is an exploded perspective view showing an example of a mechanical configuration in which the display device serves as a television receiver.

DESCRIPTION OF EMBODIMENTS

An embodiment of the present invention is described below with reference to the drawings.

(Configuration of Liquid Crystal Display Device)

Figure 1:
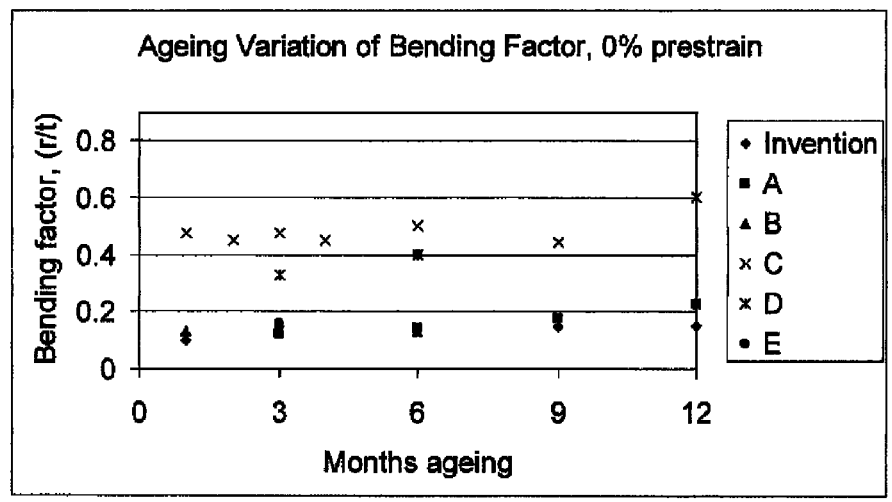
FIG. 1 is a block diagram illustrating a configuration of a liquid crystal display device of an embodiment of the present invention along with an equivalent circuit of a display section of the liquid crystal display device.

FIG. 1 is a block diagram illustrating a configuration of a liquid crystal display device of the present invention along with an equivalent circuit of a display device of the liquid crystal display device. The liquid crystal display device includes: a source driver 300 serving as a data signal line driving circuit, a gate driver 400 serving as a scanning signal line driving circuit, an active matrix display section 100, a backlight 600 serving as a planar illumination device, a light source driving circuit 700 that drives the backlight, a display control circuit 200 that controls the source driver 300, the gate driver 400, and the light source driving circuit 700, and a correction circuit 30 that corrects a digital video signal Dv supplied from an external signal source. In the present embodiment, the display section 100 is realized as an active matrix liquid crystal panel. However, it is also possible that the display section 100 is integral with the source driver 300 and the gate driver 400 so that the display section 100, source driver 300, and gate driver 400 constitute a liquid crystal panel.

The display section 100 of the liquid crystal display device includes: a plurality of (m) gate lines GL1 to GLm which serve as scanning signal lines, a plurality of (n) source lines SL1 to SLn which serve as data signal lines and each of which crosses each of the gate lines GL1 to GLm, and a plurality of (m×n) pixel forming sections 20 which are provided so as to correspond to respective intersections of the gate lines GL1 to GLm and the source lines SL1 to SLn. The pixel forming sections 20 are disposed in a matrix so as to constitute a pixel array. In the pixel array, a direction in which the gate lines extend is hereinafter referred to as a row direction, and a direction in which the source lines extend is hereinafter referred to as a column direction.

Each of the pixel forming sections 20 is constituted by a TFT 10 that is a switching element whose gate terminal is connected to a gate line GLj that passes through a corresponding intersection and whose source terminal is connected to a source line SLi that passes through the intersection, a pixel electrode that is connected to a drain terminal of the TFT 10, a common electrode Ec that is a counter electrode shared by the plurality of pixel forming sections 20, and a liquid crystal layer that is shared by the plurality of pixel forming section 20 and that is sandwiched between the pixel electrode and the common electrode Ec. A liquid crystal capacitance formed by the pixel electrode and the common electrode Ec constitutes a pixel capacitance Cpix'. Normally, an auxiliary capacitance (retention capacitance) is provided in parallel to the liquid crystal capacitance so that a voltage is surely retained in the pixel capacitance. However, the auxiliary capacitance is not described nor illustrated since the auxiliary capacitance is not directly related to the present embodiment.

To a pixel electrode of each of the pixel forming sections 20, an electric potential which varies depending on an image to be displayed is given by the source driver 300 and the gate driver 400, and to the common electrode Ec, a predetermined electric potential Vcom is given by a power supply circuit (not shown). Thus, a voltage that corresponds to a difference in electric potential between the pixel electrode and the common electrode Ec is applied to liquid crystal. The voltage application controls an amount of light transmitted by the liquid crystal layer. Thus, the image is displayed.

In the present embodiment, it is assumed that a VA (Vertical Alignment) type liquid crystal display device is used. In a VA type liquid crystal display device, liquid crystal sandwiched between substrates is aligned substantially vertically with respect to a substrate surface when no voltage is applied. In this state, a polarization plane of light that has entered the liquid crystal display device is scarcely twisted in a liquid crystal layer. Meanwhile, when a voltage is applied, the liquid crystal is aligned at an angle with respect to a direction vertical to the substrate surface. The angle at which the liquid crystals are aligned depends on a value of the applied voltage. In this state, a polarization plane of light that has entered the liquid crystal display device is twisted in the liquid crystal layer. Accordingly, in a case where two polarization plates that are respectively disposed on a light incident side and a light emission side of the liquid crystal display device are disposed so that polarization axes of the two polarization plates are in a crossed Nicols state, normally black display is achieved in which black display is carried out when no voltage is applied whereas white display is carried out when a voltage is applied.

However, the present invention is not limited to such a VA type liquid crystal display device, and can be applied also to a TN (Twisted Nematic) type liquid crystal display device. Further, the present invention is not limited to normally black display, and can be applied also to normally white display.

The backlight 600 is a planar illumination device that illuminates the display section 100 from behind the display section 100. The backlight 600 is constituted by a light guide plate and a cold-cathode tube serving as a linear light source, for example. The backlight 600 is driven and turned on by the light source driving circuit 700 so as to irradiate the pixel forming sections 20 of the display section 100 with light.

The correction circuit 30 corrects a digital video signal (image signal) Dv supplied from an external signal source, and supplies a corrected digital video signal Dv' to the display control circuit 200. In the configuration shown in FIG. 1, the correction circuit 30 is provided outside the display control circuit 200. However, the correction circuit 30 may be provided within the display control circuit 200. Further, another arrangement is also possible in which the correction circuit 30 corrects a digital image signal (image signal) DA supplied from the display control circuit 200, and supplies a corrected image signal DA' to the source driver 300.

The display control circuit 200 receives, from an external signal source, a digital video signal Dv indicative of an image to be displayed, a horizontal sync signal HSY and a vertical sync signal VSY that correspond to the digital video signal Dv, and a control signal Dc for controlling a display operation. Based on these signals Dv, HSY, VSY, and Dc thus received, the display control circuit 200 generates and outputs, as signals for causing the display section 101 to display the image indicated by the digital video signal Dv, a data start pulse signal SSP, a data clock signal SCK, a latch strobe signal (data signal application control signal) LS, and a polarity inverting signal POL, a digital image signal DA (signal corresponding to the digital video signal Dv) indicative of the image to be displayed, a gate start pulse signal GSP, a gate clock signal GCK, and a gate driver output control signal (scanning signal output control signal) GOE.

More specifically, the digital video signal Dv is subjected to timing adjustment in an internal memory as necessary, and then outputted, as the digital image signal DA, from the display control circuit 200. The data clock signal SCK is generated as a signal constituted by pulses corresponding to respective pixels of the image indicated by the digital image signal DA. The data start pulse signal SSP that becomes high level (H level) every 1 horizontal scanning period only for a predetermined period of time is generated based on the horizontal sync signal HSY. The gate start pulse signal GSP (GSPa, GSPb) that becomes H level every 1 frame period (1 vertical scanning period) only for a predetermined period of time is generated based on the vertical sync signal VSY. The gate clock signal GCK (GCKa, GCKb) is generated based on the horizontal sync signal HSY. The latch strobe signal LS and the gate driver output control signal GOE (GOEa, GOEb) are generated based on the horizontal sync signal HSY and the control signal Dc.

Among the signals thus generated in the display control circuit 200, the digital image signal DA, the latch strobe signal LS, the data start pulse signal SSP, the data clock signal SCK, and the polarity inverting signal POL are supplied to the source driver 300, whereas the gate start pulse signal GSP, the gate clock signal GCK, and the gate driver output control signal GOE are supplied to the gate driver 400.

Based on the digital image signal DA, the data start pulse signal SSP, the data clock signal SCK, the latch strobe signal LS, and the polarity inverting signal POL, the source driver 300 sequentially generates data signals S(1) through S(n) for each horizontal period as analog voltages corresponding to pixels values on horizontal scanning lines of the image indicated by the digital image signal DA. The data signals S(1) through S(n) are applied to the source lines SL1 through SLn, respectively.

The gate driver 400 generates scanning signals G(1) through G(m) based on the gate start pulse signal GSP (GSPa, GSPb), the gate clock signal GCK (GCKa, GCKb), and the gate driver output control signal GOE (GOEa, GOEb). The scanning signals G(1) through G(m) are respectively applied to the gate lines GL1 through GLm so that the gate lines GL1 through GLm are selectively driven. This selective driving of the gate lines GL1 through GLm is realized by applying, as the scanning signal G(1) through G(m), gate-on pulses whose pulse width is a selection period. In the present embodiment, gate-on pulses Pw applied to the respective gate lines have an identical pulse width except for some driving examples. Accordingly, charging conditions are the same among the pixels. This allows display to be carried out more uniformly on an entire display screen, thereby achieving better display quality.

The source lines SL1 through SLn and the gate lines GL1 through GLm of the display section 100 are thus driven by the source driver 300 and the gate driver 400 so that a voltage of the source line SLi is applied to the pixel capacitance Cpix via a TFT 10 connected to the gate line GLj which has been selected (i=1 to n, j=1 to m). Thus, in each of the pixel forming sections 20, a voltage whose intensity depends on the digital image signal DA is applied to the liquid crystal layer. The voltage application controls how much light emitted from the backlight 600 is transmitted. Thus, the image indicated by the digital video signal Dv which is externally supplied is displayed on the display section 100.

Examples of a display mode include sequential scanning (progressive scanning) and interlace scanning. The progressive scanning is classified into frame inversion driving and multi-line inversion driving. The frame inversion driving is a driving mode for sequential scanning in which a polarity is inverted every 1 frame period. The multi-line inversion driving is a driving mode for sequential scanning in which a polarity is inverted for every two or more horizontal scanning periods.

The interlace scanning is a mode in which the gate lines GL1 through GLm are equally divided into groups so that spacing between adjacent gate lines is uniform in each of the groups, and the groups are sequentially scanned. The interlace scanning is largely classified into a full screen interlace scanning and block inversion driving. The full screen interlace scanning is a mode in which all the gate lines on a screen are interlace-scanned. The block inversion driving is a mode in which the gate lines are divided into blocks, and interlace scanning is performed for each of the blocks.

In any of the driving modes, the display unevenness occurs. The present invention can be applied to any of the driving modes, and can reduce the display unevenness. Details of this are described below.

(Configuration of Correction Circuit)

Next, a configuration of the correction circuit 30 is described below with reference to FIG. 5. As illustrated in FIG. 5, the correction circuit 30 includes: a buffer 31, an interpolation calculation section (correction processing section) 32, LUTs (lookup tables) (correction amount memory sections) 33R, 33G, and 33B, a correction amount storage section 34, and an adder 35. The correction circuit is constituted by an ASIC, for example.

The buffer 31 is storage means for temporarily storing the digital video signal Dv. In the buffer 31, a red gradation value (R gradation value), a green gradation value (G gradation value), and a blue gradation value (B gradation value) of pixels that are adjacent in a direction in which the gate lines extend are sequentially stored by using the FIFO method.

The interpolation calculation section 32 sequentially reads out the data stored in the buffer 31, and carries out interpolation calculation with reference to LUTs 33R, 33G, and 33B so as to calculate a correction amount. More specifically, the interpolation calculation section 32 reads out, from the buffer 31, the G gradation value and the B gradation value of the pixels that are adjacent in the direction in which the gate lines extend, and carries out interpolation calculation with reference to the LUT 33B so as to calculate a correction amount for the B gradation value. Similarly, the interpolation calculation section 32 reads out, from the buffer 31, the B gradation value and the R gradation value, and carries out interpolation calculation with reference to the LUT 33R so as to calculate a correction amount for the R gradation value. Further, the interpolation calculation section 32 reads out, from the buffer 31, the R gradation value and the G gradation value, and carries out interpolation calculation with reference to the LUT 33G so as to calculate a correction amount for the G gradation value. Details of the interpolation calculation are described later.

Each of the LUTs 33R, 33G, and 33B is constituted by a two-dimensional memory which stores a relationship between gradation values of two color components and a correction amount for one of the two color components. A specific configuration of each of the LUTs 33R, 33G, and 33B is described later.

The correction amount storage section 34 is storage means for temporarily storing corrections amount for the R gradation value, G gradation value and B gradation value which correction amounts have been calculated by the interpolation calculation section 32. The adder 35 reads out a correction amount from the correction amount storage section 34. Further, the adder 35 reads out, from the buffer 31, a gradation value corresponding to the correction amount, and adds the correction amount to the gradation value thus read out. Specifically, the adder 35 first reads out a correction amount for a specific color component from the correction amount storage section 34. Further, the adder 35 reads out a gradation value of the color component from the buffer 31. Then, the adder 35 adds the correction amount thus read out to the gradation value thus read out, and outputs a sum of the gradation value and the correction amount. These processes are sequentially carried out for a gradation value of each color component. Thus, the corrected digital video signal Dv' is supplied from the correction circuit 30.

In the present embodiment, the correction circuit 30 corrects each of red gradation value (R gradation value) green gradation value (G gradation value) and blue gradation value (B gradation value). However, the correction circuit 30 may correct only a gradation value of a specific color component.

(Occurrence of Stripe in Block Inversion Driving and Countermeasure Against it)

Figure 2:
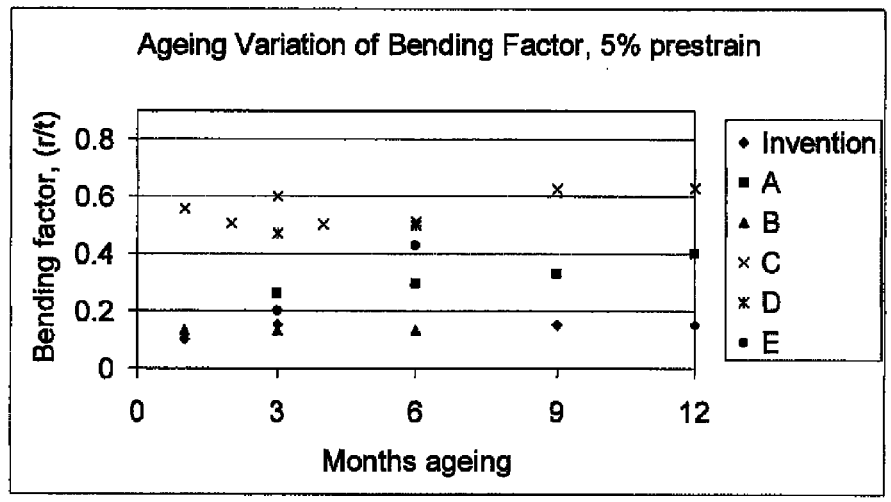
FIG. 2 is a circuit diagram illustrating a pixel forming section of the display section.

FIG. 2 is a circuit diagram illustrating an image forming section 20 of the display section 100. The image forming section 20 is provided so as to correspond to an intersection of a gate line GLi and a source line SLi, and forms a green pixel G. An adjoining image forming section 20 on the right side of this image forming section 20, i.e., image forming section 20 provided so as to correspond to an intersection of the gate line GLi and a source line SL(i+1) forms a blue pixel B.

Further, coupling occurs between a drain and a source of a TFT 10 of the source line SLi due to parasitic capacitance $Csd_{self}$. Further, coupling occurs between the drain of the TFT 10 of the source line SLi and a source of a TFT 10 of the source line SL(i+1) due to parasitic capacitance $Csd_{other}$.

Accordingly, pixel capacitance Cpix which takes the parasitic capacitance into consideration is expressed by the following equation (1):

$$Cpix=Cpix'+CSd_{self}+Csd_{other} \qquad (1)$$

Hereinafter, the source line SLi is referred to as a source line SLG that supplies a voltage to the green pixel, and the source line SL(i+1) is referred to as a source line SLB that supplies a voltage to the blue pixel. Further, the following equation (2) is established:

$$Cpix'(V-Vcom)+Csd_{self}(V-V_{SG1})+Csd_{other}(V-V_{SB1})=Cpix'(V'-Vcom)+Csd_{self}(V'-V_{SG2})+Csd_{other}(V'-V_{SB2}) \qquad (2)$$

where V and V' are electric potentials of a drain D of the TFT 10 which are achieved before and after polarity inversion, respectively, in a state where green halftone uniform display is carried out. Here, the left side of the equation (2) is the total sum of electric charges obtained before the polarity inversion, and the right side of the equation (2) is the total sum of electric charges obtained after the polarity inversion Further, $V_{SG1}$ is an electric potential of the source line $SL_G$ achieved before the polarity inversion, $V_{SG2}$ is an electric potential of the source line $SL_G$ achieved after the polarity inversion, $V_{SB1}$ is an electric potential of the source line $SL_B$ achieved before the polarity inversion, and $V_{SB2}$ is an electric potential of the source line $SL_B$ achieved after the polarity inversion.

The following equation (3) can be obtained by moving all the terms containing V or V' to the left side of the equation (2) and moving all the terms containing $V_{SG1}$, $V_{SG2}$, $V_{SB1}$ or $V_{SB2}$ to the right side of the equation (2):

$$Cpix'(V-V')+Csd_{self}(V-V')+Csd_{other}(V-V')=Csd_{self}(V_{SG2}-V_{SG2})-CSd_{other}(V_{SB2}-V_{SB1}) \qquad (3)$$

The following equation (4) is obtained by factoring (V−V') out of the equation (3):

$$(Cpix'+CSd_{self}+Csd_{other})(V-V')=CSd_{self}(V_{SG1}-V_{SG2})-Csd_{other}(V_{SB2}-V_{SB1}) \qquad (4)$$

The following equation (5) is obtained by dividing both sides of the equation (4) by $(Cpix'+Csd_{self}+Csd_{other})$.

$$(V-V')=\{Csd_{self}(V_{SG1}-V_{SG2})-Csd_{other}(V_{SB2}-V_{SB1})\}/(Cpix'+Csd_{self}+Csd_{other}) \qquad (5)$$

An amplitude voltage $V_{SG}$ of the source line $SL_G$ is expressed by $V_{SG}=V_{SG1}-V_{SG2}$, an amplitude voltage $V_{SB}$ of the source line $SL_B$ is expressed by $V_{SB}=V_{SB2}-V_{SB1}$, and voltage change $V_{SD}$ of the drain of the TFT 10 is expressed by $V_{SD}=V-V'$. Further, the pixel capacitance Cpix which takes the parasitic capacitance into consideration is expressed by the equation (1).

The following equation (6) is obtained by applying these to the equation (5).

$$V_{SD}=Csd_{self}/Cpix \times V_{SG}-Csd_{other}/Cpix \times V_{SB} \qquad (6)$$

In a case where the green halftone uniform display is carried out, the voltage of the drain fluctuates by the amplitude $V_{SD}$ in a polarity inversion cycle. Hereinafter, a period in which the voltage of the drain is increased is referred to as a period of homopolarity, and a period in which the voltage of the drain is decreased is referred to as a period of antipolarity. In this case, an effective voltage reduction amount $V_{SDE}$ which is an effective value of a voltage reduction amount of the drain voltage of the TFT 10 is expressed by the following equation (7):

$$V_{SDE}=V_{SD} \times T/V\text{total}=\{Csd_{self}/Cpix \times V_{SG}-Csd_{other}/Cpix \times V_{SB}\} \times T/V\text{total} \quad (7)$$

where Vtotal is a vertical scanning period of 1 frame and T is the total sum of a period of antipolarity in the vertical scanning period Vtotal. Since the parasitic capacitance $Csd_{self}$ and the parasitic capacitance $Csd_{other}$ are generated in each of the pixel forming sections 20, a voltage level of a source signal voltage of the source line $SL_G$ and a voltage level of a source signal voltage of the source line $SL_B$ change. This results in that the effective voltage reduction amount $V_{SDE}$ differs from one line to another.

(a) of FIG. 3 is a timing chart showing how a drain voltage DG changes in response to change in signal voltage of the source line $SL_G$ and signal voltage of the source line $SL_B$ in a case where the block inversion driving is carried out. In (a) of FIG. 3, $S_G$ is a signal of the source line $SL_G$, and $S_B$ is a signal of the source line $SL_B$. Further, $D_{G1}$ is a drain voltage of a first line (first row), and $D_{G95}$ is a drain voltage of a 95th line (95th row).

The drain voltage $D_{G1}$ rises at a timing of (1) of (a) of FIG. 3. Thus, a pixel capacitance is charged and the voltage is retained. Further, at a timing of (1)', a polarity of the drain voltage $D_{G1}$ is inverted so that the drain voltage $D_{G1}$ falls. Thus, the pixel capacitance is charged again and the voltage is retained. Accordingly, electric charge stored in a pixel capacitance of a corresponding pixel forming section 20 is retained during the vertical scanning period Vtotal (=1200 H (1200 lines)) of 1 frame.

The drain voltage $D_{G95}$ rises at a timing of (2) of (a) of FIG. 3. Thus, a pixel capacitance is charged and the voltage is retained. Further, at a timing of (2)', a polarity of the drain voltage $D_{G95}$ is inverted so that the drain voltage $D_{G95}$ falls. Thus, the pixel capacitance is charged again and the voltage is retained. Accordingly, as with the drain voltage $D_{G1}$, electric charge stored in a pixel capacitance of a corresponding pixel forming section 20 during the vertical scanning period Vtotal (=1200 H (1200 lines)) of 1 frame is retained.

Diagonal lined sections of the drain voltage $D_{G1}$ and the drain voltage $D_{G95}$ indicate the period of antipolarity. Since the signal $S_G$ falls at the timing of (1)', and the signal $S_B$ falls at the timing of (2)', the period of antipolarity of the drain voltage $D_{G95}$ is longer by 49 H than that of the drain voltage $D_{G1}$, as shown in the table of (b) of FIG. 3. Accordingly, an effective value of the drain voltage $D_{G95}$ is smaller than that of the drain voltage $D_{G1}$.

According to the equation (7), the effective voltage reduction amount $V_{SDE}$ of the drain voltage varies from one line to another and becomes larger as the total sum T of the period of antipolarity becomes longer. Accordingly, a luminance value falls and rises in a 48 H cycle as shown in FIG. 14. As a result, a stripe is produced every 48 lines as shown in FIG. 12 in a case where green halftone monochromatic display is carried out.

FIG. 4 is a V-T characteristic view showing a relationship between a voltage Vg applied to liquid crystal and transmittance T in a liquid crystal display device. As shown in FIG. 4, a region in which a change in transmittance T is greater than a change in applied voltage Vg, i.e., a region in which a slope of a V-T curve is large is a region that is greatly affected by the effective voltage reduction amount $V_{SDE}$.

In order to prevent occurrence of a stripe, it is only necessary that the amplitude voltage $V_{SB}$ is made larger in the equation (7) so that the effective voltage reduction amount $V_{SDE}$ of the drain voltage is reduced. Thus, differences in luminance among the lines can be reduced. For this purpose, the correction circuit 30 performs R, G, B gradation control in accordance with a stripe occurrence level in the green halftone uniform display. An example of this is described below.

For example, in the display section 100 in which the green pixel G and the blue pixel B are disposed in a row direction in this order as shown in FIG. 2, a blue gradation voltage is increased in accordance with the LUT 33B shown in FIG. 15 so that differences in luminance among lines are reduced.

In the LUT 33B shown in FIG. 15, a numeral at an intersection of a green gradation value and a blue gradation value represents a correction amount for the blue gradation value. For example, in a case where a green gradation value of inputted data is 32 and a blue gradation value of the inputted data is 0, the interpolation calculation section 32 stores a correction amount 3 in the correction amount storage section 34 with reference to the LUT 33B of Table 1. Then, the adder 35 adds the blue correction amount 3 to the blue gradation value 0. Thus, a corrected blue gradation value 3 is outputted.

In a case where a green gradation value of inputted data is 30 and a blue gradation value of the inputted data is 0, the interpolation calculation section 32 performs, with reference to the LUT 33B of Table 1, interpolation with respect to (i) a correction amount 2 for the blue gradation value, which is obtained in a case where the green gradation value is 24 and the blue gradation value is 0, and (ii) a correction amount 3 for the blue gradation value, which is obtained in a case where the green gradation value is 32 and the blue gradation value is 0. Thus, the interpolation calculation section 32 calculates a correction amount for the blue gradation value obtained in a case where the green gradation value is 30 and the blue gradation value is 0.

Similarly, green gradation stripes that occur in a case where red monochromatic display is carried out can be prevented by correcting a green gradation value in accordance with the LUT 33G indicating correction amounts for the green gradation value. Further, red gradation stripes that occur in a case where blue monochromatic display is carried out can be prevented by correcting a red gradation value in accordance with the LUT 33R indicating correction amounts for the red gradation value.

As described above, the correction circuit 30 corrects a display state where stripes occur in the block inversion driving, i.e., a gradation value of each color component. This makes it possible to prevent occurrence of stripes in any of the green halftone uniform display, blue halftone uniform display, and red halftone uniform display.

In the above example, it is assumed that pixels of an identical color component are connected to a single source line. However, the present embodiment is not limited to this. Another arrangement is also possible in which pixels of different color components are connected to a single source line. Even with this arrangement, occurrence of stripes can be suppressed by the correction processing carried out by the correction circuit 30.

(Occurrence of Stripe in Frame Inversion Driving and Countermeasure against It)

In the frame inversion driving (source line inversion driving) in which a polarity is inverted every 1 frame, an effective voltage reduction amount $V_{SDE}$ of a drain voltage varies depending on timing of gate-on. FIG. 6 is a timing chart showing how a drain voltage $D_G$ changes in response to a change in signal voltage of the source line $SL_G$ and a signal voltage of the source line $SL_B$ in the frame inversion driving.

In the timing chart of FIG. 6, a period during which a drain voltage $D_{G100}$ of the 100th row is affected by an antipolarity is different from a period during which a drain voltage $D_{G600}$ of the 600th row is affected by an antipolarity. Specifically, the period during which the drain voltage $D_{G600}$ of the 600th row is affected by the antipolarity is longer than the period during which the drain voltage $D_{G100}$ of the 100th row is affected by the antipolarity. Accordingly, according to the equation (7), an effective voltage reduction amount $V_{SDE}$ of the drain voltage $D_{G600}$ of the 600th row is larger than that of the drain voltage $D_{G100}$ of the 100th row.

FIG. 7 is a graph indicating that an effective value of a drain voltage changes from one line to another in the frame inversion driving. Luminance values of the respective lines can be obtained by calculating effective values of drain voltages of the respective lines.

As shown in FIG. 7, during 1 frame period, a line that is scanned later has a drain voltage of a smaller effective value. Accordingly, luminance gradually declines during 1 frame period.

Consequently, such a gradual decline in luminance during 1 frame period appears as gradation on a screen on which green halftone uniform display is carried out, as shown in FIG. 8. Similarly, gradation appears also in a case where the blue halftone uniform display or the red halftone uniform display is carried out.

Also in a case where the frame inversion driving is carried out, it is only necessary that the amplitude voltage $V_{SB}$ of the source line $SL_B$ is made larger in the equation (7) so that an effective voltage reduction amount $V_{SDE}$ of a drain voltage of a TFT 10 is reduced. Thus, differences in luminance among the lines can be reduced. That is, occurrence of gradation within a screen can be suppressed by the correction processing carried out by the correction circuit 30.

The above description has dealt with an example in which the interlace scanning is carried out by the block inversion driving. However, even in a case where the full screen interlace scanning is carried out, gradation unevenness occurs on an entire screen as in the case of the frame inversion driving. Also in this case, the occurrence of gradation within a screen can be suppressed by the correction processing carried out by the correction circuit 30.

(Occurrence of Stripe in Multi-Line Inversion Driving and Countermeasure Against it)

In the multi-line inversion driving, e.g., a driving mode for sequential scanning in which a polarity is inverted every 10 lines, an effective voltage reduction amount $V_{SDE}$ of a drain voltage varies depending on timing of gate-on. FIG. 9 is a timing chart showing how a drain voltage $D_G$ changes in response to a change in signal voltage of the source line $SL_G$ and signal voltage of the source line $SL_B$ in the multi-line inversion driving.

In the timing chart of FIG. 9, a period during which a drain voltage $D_{G1}$ of the first row is affected by an antipolarity is different from a period during which a drain voltage $D_{G10}$ of the 10th row is affected by an antipolarity. Specifically, the period during which the drain voltage $D_{G10}$ of the 10th row is affected by the antipolarity is longer than the period during which the drain voltage $D_{G1}$ of the first row is affected by the antipolarity. Accordingly, according to the equation (7), an effective voltage reduction amount $V_{SDE}$ of the drain voltage $D_{G10}$ of the 10th row is larger than that of the drain voltage $D_{G1}$ of the first row.

FIG. 10 is a graph indicating that an effective value of a drain voltage changes from one line to another in the multi-line inversion driving. Luminance values of the respective lines can be obtained by calculating effective values of drain voltages of the respective lines.

Accordingly, a gradual reduction in luminance occurs every 10 lines in response to a change in effective value of the drain voltage shown in FIG. 10. This reduction in luminance that occurs every 10 lines causes a stripe every 10 lines as shown in FIG. 11. Such a stripe occurs also in a case where red halftone uniform display or the blue halftone uniform display is carried out.

Also in a case where the multi-line inversion driving is carried out, it is only necessary that the amplitude voltage $V_{SB}$ of the source line $SL_B$ is made larger in the equation (7) so that an effective voltage reduction amount $V_{SDE}$ of a drain voltage of a TFT 10 is reduced. Thus, differences in luminance among the lines can be reduced. That is, occurrence of stripes can be suppressed by the correction processing carried out by the correction circuit 30.

(Configuration of Television Receiver)

The following description deals with an example in which the liquid crystal display device of the present invention is used in a television receiver. FIG. 16 is a block diagram illustrating a configuration of a display device 800 for use in the television receiver. The display device 800 includes: a Y/C separation circuit 80, a video chroma circuit 81, an A/D converter 82, a liquid crystal controller 83, a liquid crystal panel 84, a backlight driving circuit 85, a backlight 86, a microcomputer 87, and a grayscale circuit 88. The liquid crystal panel 84 corresponds to the liquid crystal display device of the present invention, and includes: a display section including active matrix pixel arrays; and a source driver and a gate driver each for driving the display section.

In the display device 800 thus configured, first, the Y/C separation circuit 80 receives, from an outside, a complex color video signal Scv as a television signal, and then separates the complex color video signal Scv into a luminance signal and a color signal. The video chroma circuit 81 converts the luminance signal and the color signal into analog RGB signals corresponding to three fundamental colors of light. Further, the A/D converter 82 converts the analog RGB signals into digital RGB signals. The digital RGB signals are supplied to the liquid crystal controller 83. Moreover, the Y/C separation circuit 80 extracts horizontal and vertical sync signals from the complex color video signal Scv supplied from the outside. These sync signals are also supplied to the liquid crystal controller 83 via the microcomputer 87.

The liquid crystal controller 83 supplies data signals for drivers based on the digital RGB signals (corresponding to the aforementioned digital video signals Dv) supplied from the A/D converter 82. Further, the liquid crystal controller 83 generates, based on the sync signals, timing control signals for causing the source driver and the gate driver in the liquid crystal panel 84 to operate as in the above Embodiment, and supplies the timing control signals to the source driver and the gate driver. Further, the grayscale circuit 88 generates gradation voltages of three fundamental colors R, G, and B of color display, and supplies these gradation voltages to the liquid crystal panel 84.

In the liquid crystal panel 84, drive signals (e.g., data signals and scanning signals) are generated by the source and gate drivers inside the liquid crystal panel 84 in accordance with the data signals for drivers, the timing control signals, and the gradation voltages. A color image is displayed on a display section inside the liquid crystal panel 84 in accordance with the drive signals. In order that an image is displayed by the liquid crystal panel 84, the liquid crystal panel 84 needs to be irradiated with light from behind the liquid crystal panel 84. In the display device 800, the backlight driving circuit 85 drives the backlight 86 under control of the microcomputer 87. Thus, a back side of the liquid crystal panel 84 is irradiated with light.

The whole system, including these processes, is controlled by the microcomputer 87. As the video signal (complex color video signal) supplied from the outside, not only a video signal based on television broadcast but also a video signal taken by a camera or supplied via the Internet line is also usable. In the display device 800, display can be performed based on various video signals.

In a case where an image based on television broadcast is displayed by the display device 800 thus configured, a tuner section 90 is connected to the display device 800, as shown in FIG. 17. The tuner section 90 extracts a channel signal to be received from waves (high-frequency signals) received by an antenna (not illustrated), and converts the channel signal into an intermediate frequency signal. The tuner section 90 detects the intermediate frequency signal so as to extract a complex color video signal Scv as a television signal. The complex color video signal Scv is supplied to the display device 800 as described above, and the display device 800 displays an image based on the complex color video signal Scv.

FIG. 18 is an exploded perspective view showing an example of a mechanical configuration in which the display device configured as above serves as a television receiver. In the example shown in FIG. 18, the television receiver includes, as its constituents, a first housing 801 and a second housing 806 in addition to the display device 800. The liquid crystal display device 800 is interposed between the first housing 801 and the second housing 806 so as to be enclosed by the first housing 801 and the second housing 806. The first housing 801 has an opening 801a through which an image displayed by the display device 800 is transmitted. Further, the second housing 806, which covers a back side of the display device 800, is provided with an operation circuit 805 for operating the display device 800, and has a supporting member 808 attached to a lower side thereof.

The present invention is not limited to the description of the embodiments above, but may be altered by a skilled person within the scope of the claims. An embodiment based on a proper combination of technical means disclosed in different embodiments is encompassed in the technical scope of the present invention.

For convenience of explanation, data signal lines are provided so as to extend in a column direction and scanning signal lines are provided so as to extend in a row direction. It is needless to say that the present invention also encompasses a configuration in which the screen is rotated by 90 degrees.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A liquid crystal display device of the present invention is applicable to various display devices such as a monitor of a personal computer and a television receiver.

REFERENCE SIGNS LIST

10: TFT
20: Pixel forming section
30: Correction circuit
31: Buffer
32: Interpolation calculation section
33R, 33G, 33B: LUT
34: Correction amount storage section
35: Adder
80: Y/C separation circuit
81: Video chroma circuit
82: A/D converter
83: Liquid crystal controller
84: Liquid crystal panel
85: Backlight driving circuit
86: Backlight
87: Microcomputer
88: Grayscale circuit
90: Tuner section
100: Display section
200: Display control circuit
300: Source driver
400: Gate driver
600: Backlight
700: Light source driving circuit
800: Display device
801: First housing
801a: Opening
805: Operation circuit
806: Second housing
808: Supporting member

The invention claimed is:

1. A data processing apparatus which corrects an image signal constituted by a plurality of pixel data that are externally supplied to an active matrix liquid crystal driving panel including a plurality of scanning signal lines that extend in one direction, a plurality of data signal lines that extend in another direction, and a plurality of pixels that are provided so as to correspond to respective intersections of the plurality of scanning signal lines and the plurality of data signal lines, the data processing apparatus, comprising:
a correction processing section that (i) acquires pixel data of a first pixel for display of a first color component and pixel data of a second pixel for display of a second color component, the second pixel being driven by a scanning signal line which drives the first pixel and being driven by a data signal line which is adjacent to the first pixel, and (ii) corrects the pixel data of the second pixel in accordance with a relationship between a value of the pixel data of the first pixel and a value of the pixel data of the second pixel; and
a correction amount memory section that stores correction amount data corresponding to a combination of the value of the pixel data of the first pixel and the value of the pixel data of the second pixel, the correction processing section carrying out the correction with reference to the correction amount memory section,
wherein the correction processing section calculates a correction amount by carrying out interpolation calculation based on data stored in the correction amount memory section.

2. The data processing apparatus according to claim 1, wherein:
the image signal contains pixel data of a red color component, pixel data of a green color component, and pixel data of a blue color component, and the correction processing section carries out the correction with respect to each of the pixel data of the red color component, the pixel data of the green color component, and the pixel data of the blue color component.

3. A liquid crystal display device comprising:

an active matrix liquid crystal driving panel including a plurality of scanning signal lines that extend in one direction, a plurality of data signal lines that extend in another direction, and a plurality of pixels that are provided so as to correspond to respective intersections of the plurality of scanning signal lines and the plurality of data signal lines;

a scanning signal driving section that sequentially applies, to the plurality of scanning signal lines, gate-on pulses each of which causes one of the plurality of scanning signal lines to be in a selected state;

a data signal driving section that applies data signals to the plurality of data signal lines so that polarities of the data signals are inverted for every predetermined plural horizontal periods within 1 frame period; and the data processing device as set forth in claim 1.

4. The liquid crystal display device according to claim 3, wherein: the data signal driving section carries out polarity inversion driving so that one polarity continues for plural horizontal scanning periods.

5. The liquid crystal display device according to claim 4, wherein:

the plurality of scanning signal lines are divided into one or more blocks, and scanning signal lines in each of the blocks are further divided into groups, the scanning signal driving section sequentially scans blocks of scanning signal lines and sequentially scans the groups of scanning signal lines in each block such that the scanning signal lines in each block are interlace-scanned, and the data signal driving section applies the data signals to the plurality of data signal lines so that the polarities of the data signals are inverted at a timing of switching of a group to be scanned.

6. The liquid crystal display device according to claim 5, wherein the number of blocks into which the plurality of scanning signal lines are divided is 1.

7. The liquid crystal display device according to claim 5, wherein the number of blocks into which the plurality of scanning signal lines are divided is two or more.

8. The liquid crystal display device according to claim 4, wherein:

the plurality of scanning signal lines are divided into one or more blocks, the scanning signal driving section sequentially scans the plurality of scanning signal lines so as to drive the plurality of scanning signal lines, and the data signal driving section applies the data signals to the plurality of data signal lines so that the polarities of the data signals are inverted at a timing of switching of a group to be scanned.

9. The liquid crystal display device according to claim 8, wherein the number of blocks into which the plurality of scanning signal lines are divided is 1.

10. The liquid crystal display device according to claim 8, wherein the number of blocks into which the plurality of scanning signal lines are divided is two or more.

11. A television receiver comprising:

the liquid crystal display device as set forth in claim 3; and a tuner section that receives television broadcast.

* * * * *